(12) United States Patent
Sussek

(10) Patent No.: US 10,486,673 B2
(45) Date of Patent: Nov. 26, 2019

(54) METHOD AND DEVICE FOR OPERATING A PARKING BRAKE

(71) Applicant: Robert Bosch GmbH, Stuttgart (DE)

(72) Inventor: Ullrich Sussek, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/544,274

(22) PCT Filed: Dec. 28, 2015

(86) PCT No.: PCT/EP2015/081271
§ 371 (c)(1),
(2) Date: Jul. 18, 2017

(87) PCT Pub. No.: WO2016/116249
PCT Pub. Date: Jul. 28, 2016

(65) Prior Publication Data
US 2017/0361826 A1 Dec. 21, 2017

(30) Foreign Application Priority Data

Jan. 22, 2015 (DE) .................. 10 2015 201 002

(51) Int. Cl.
*B60T 17/22* (2006.01)
*B60T 7/10* (2006.01)
(Continued)

(52) U.S. Cl.
CPC ............ *B60T 17/221* (2013.01); *B60T 7/107* (2013.01); *B60T 8/172* (2013.01); *F16D 65/18* (2013.01);
(Continued)

(58) Field of Classification Search
CPC ........ B60T 17/221; B60T 8/172; B60T 7/107; F16D 65/18; F16D 65/66; F16D 66/00;
(Continued)

(56) References Cited

U.S. PATENT DOCUMENTS 7,992,691 B2 * 8/2011 Maron ................. B60T 13/588
188/156
9,321,439 B2 * 4/2016 Baehrle-Miller ....... B60T 7/107
2011/0308898 A1 12/2011 Shiraki

FOREIGN PATENT DOCUMENTS

CN 101835665 A 9/2010
CN 102333970 A 1/2012
(Continued)

OTHER PUBLICATIONS

International Search Report corresponding to PCT Application No. PCT/EP2015/081271, dated Apr. 12, 2016 (German and English language document) (5 pages).

*Primary Examiner* — Kimberly S Berona
*Assistant Examiner* — Michael V Kerrigan
(74) *Attorney, Agent, or Firm* — Maginot, Moore & Beck LLP

(57) ABSTRACT

A method for operating a parking brake which has an actuator with an actuating element and an electric motor, the electric motor is operatively connected to the actuating element in order to displace the latter, the electric motor is actuated in order to displace the actuating element by a predefined movement travel, and an actual movement travel of the actuating element is monitored in order to actuate the electric motor. The method includes determining the actual movement travel of the actuating element in a manner which is dependent on a motor current and/or a motor voltage of the electric motor.

3 Claims, 1 Drawing Sheet

(51) Int. Cl.
    *B60T 8/172*         (2006.01)
    *F16D 65/18*         (2006.01)
    *F16D 65/66*         (2006.01)
    *F16D 66/00*         (2006.01)
    *F16D 65/38*         (2006.01)
    *F16D 121/24*       (2012.01)
    *F16D 125/40*       (2012.01)

(52) U.S. Cl.
    CPC .............. *F16D 65/66* (2013.01); *F16D 66/00* (2013.01); *F16D 2065/386* (2013.01); *F16D 2066/003* (2013.01); *F16D 2066/006* (2013.01); *F16D 2121/24* (2013.01); *F16D 2125/40* (2013.01)

(58) Field of Classification Search
    CPC ......... F16D 2066/003; F16D 2066/006; F16D 2121/24; F16D 2065/386; F16D 2125/40
    See application file for complete search history.

(56) References Cited

FOREIGN PATENT DOCUMENTS

| | | |
|---|---|---|
| CN | 103711817 A | 4/2014 |
| DE | 10 2004 055 876 A1 | 5/2006 |
| JP | 2014-69739 A | 4/2014 |

\* cited by examiner und 10 2015
METHOD AND DEVICE FOR OPERATING A PARKING BRAKE This application is a 35 U.S.C. § 371 National Stage Application of PCT/EP2015/081271, filed on Dec. 28, 2015, which claims the benefit of priority to Serial No. DE 10 2015 201 002.3, filed on Jan. 22, 2015 in Germany, the disclosures of which are incorporated herein by reference in their entirety.

The disclosure relates to a method for operating a parking brake that comprises an actuator having an adjusting element that can be displaced and an electric motor, wherein the electric motor is operatively connected to the adjusting element for its displacement, wherein the electric motor is controlled in order to displace the adjusting element along a predetermined movement path, and wherein an actual movement path of the adjustment element is monitored so as to control the electric motor.

Moreover, the disclosure relates to a device for operating the above-mentioned parking brake.

BACKGROUND

Methods and devices of the type mentioned in the introduction are known from the prior art. Motor vehicles are now frequently equipped with parking brakes that can be integrated in a particularly compact manner into the motor vehicle, in particular into a wheel brake of the motor vehicle. For this purpose, it is known by way of example to arrange an actuator on the brake caliper of a wheel brake, said actuator having an electric motor and an adjusting element, so as to be able to actuate the wheel brake independently of its dedicated actuation, in particular independently of a hydraulic actuation of the wheel brake. For this purpose, it is known by way of example to arrange an electric motor on the brake caliper, said electric motor operating by way of a gear mechanism on a brake pad or a brake piston as the adjusting element. The brake piston is displaced in the direction towards a brake disc by means of actuating the electric motor, said brake disc being connected in a non-rotatable manner to a wheel of the motor vehicle, wherein an adjusting torque is generated by means of the electric motor, said adjusting torque being exerted by way of the gear mechanism onto the adjusting element in order to achieve the desired clamping force or braking force on the wheel brake. It is known to achieve the clamping force by means of a predetermined movement path of the adjusting element. It is important to achieve the predetermined movement path both by firmly applying as well as releasing the parking brake. It is possible using knowledge of the actual movement path by way of example to set a release path or opening path of the parking brake with a high degree of accuracy so that the brake shoes safely release from the brake disc. Usually, a rotational speed sensor is provided so as to determine the movement path, said rotational speed sensor monitoring the rotational speed of the electric motor or the electric motor is operated in dependence upon time or the movement path of the adjusting element is ascertained directly by means of a movement path sensor.

SUMMARY

The method in accordance with the disclosure has the advantage that a rotational speed sensor or travel sensor can be omitted and it is nevertheless still possible to reliably achieve or maintain a movement path of the adjusting element under all operating conditions. It is also achieved that the desired movement path is set independently by way of example of frictional resistances or wear and tear of the actuator. In accordance with the disclosure, it is provided for this purpose that the actual movement path of the adjusting element is determined in dependence upon a motor current and/or a motor voltage of the electric motor during the actuation thereof. In other words the motor current and/or the motor voltage are ascertained and the actual movement path of the adjusting element is determined in dependence upon said motor current and/or motor voltage. As a consequence, it is possible in a simple manner to determine the position or the movement path of the adjusting element without additional sensors. The motor current and motor voltage of an electric motor are already usually ascertained when controlling said electric motor so that additional sensors are not required to implement the method in accordance with the disclosure.

Furthermore, it is preferably provided that a rotational speed signal of the electric motor is ascertained from the motor current and the motor voltage and the actual movement path is determined in dependence upon said rotational signal. It is possible to calculate the rotational speed of the electric motor with the knowledge of the motor current and motor voltage. It is then possible with the knowledge of the transmission of the gear mechanism to ascertain or determine in a simple manner the actual movement path of the adjusting element.

Moreover, it is preferably provided that the rotational speed signal is integrated in order to determine the actual movement path. The rotational speed signal is in other words integrated to form a travel signal. It is in particular provided that the rotational speed signal is integrated by way of the test cycles with which the motor current and the motor voltage are ascertained. The test cycles correspond in particular to the operating frequency and the control of the electric motor that is preferably controlled in a pulse width modulated manner.

In accordance with a preferred further development of the disclosure it is provided that the integration occurs in dependence upon a motor constant and/or a motor resistance of the electric motor. The operating performance of each electric motor depends upon the motor constant and motor resistance of said electric motor. It is possible with the knowledge of these values to determine from the ascertained motor voltage and the ascertained motor current a particularly precise rotational speed signal of the electric motor. In a first embodiment, it is provided that the method is based on a calculated motor constant and a calculated motor resistance. The calculated motor resistance and the calculated motor constant are in particular evident from the construction data of the electric motor. In accordance with a further embodiment, it is alternatively provided that the motor constant and the motor resistance are determined once when bringing the electric motor into operation and then said motor constant and motor resistance are stored in a non-volatile storage device for later use.

It is particularly preferably provided in accordance with a further embodiment that the motor constant and the motor resistance are determined every time the electric motor is switched on. The procedure of determining the motor constant and the motor resistance when switching on the electric motor has already been described in other, earlier publications so that it is not to be further described at this point. It is important that the mentioned parameters are always determined when switching on the electric motor so that in the case of every release procedure or clamping procedure of the parking brake the parameters are again determined so that the integration is always performed in dependence upon prevailing parameter values and consequently it is ensured that the actual movement path is determined in a particularly precise manner.

Moreover, it is preferably provided that the rotational speed signal is initially integrated and then is corrected using the determined motor constant and the determined motor resistance. As a consequence, it is ensured that the integration of the rotational speed signal has already been started prior to bringing the electric motor into operation, in other words prior to knowing the determined motor constant and the determined motor resistance. Only then if the motor constant and motor resistance could be successfully determined are they drawn upon so as to correct the integration. It is possible to commence the procedure of calculating or determining the actual movement path by way of example on the basis of the most recent determined values of the motor constant and the motor resistance. It is also possible to start the calculation initially on the basis of the values for motor constant and motor resistance that are originally stored in the non-volatile storage device. As soon as in the prevailing actuating procedure the motor constant and the motor resistance have been determined, the originally-selected parameter values are replaced by the prevailing determined parameter values and the method is continued.

The device in accordance with the disclosure is characterized by means of a specifically designed control device that is embodied for the purpose of implementing the method in accordance with the disclosure when used in the proper manner. As a consequence, the above mentioned advantages occur. Further advantages and features are evident in the above descriptions and also the claims.

BRIEF DESCRIPTION OF THE DRAWINGS

The disclosure is further explained hereinunder with reference to the drawings. In the drawings

DETAILED DESCRIPTION

Figure 1:
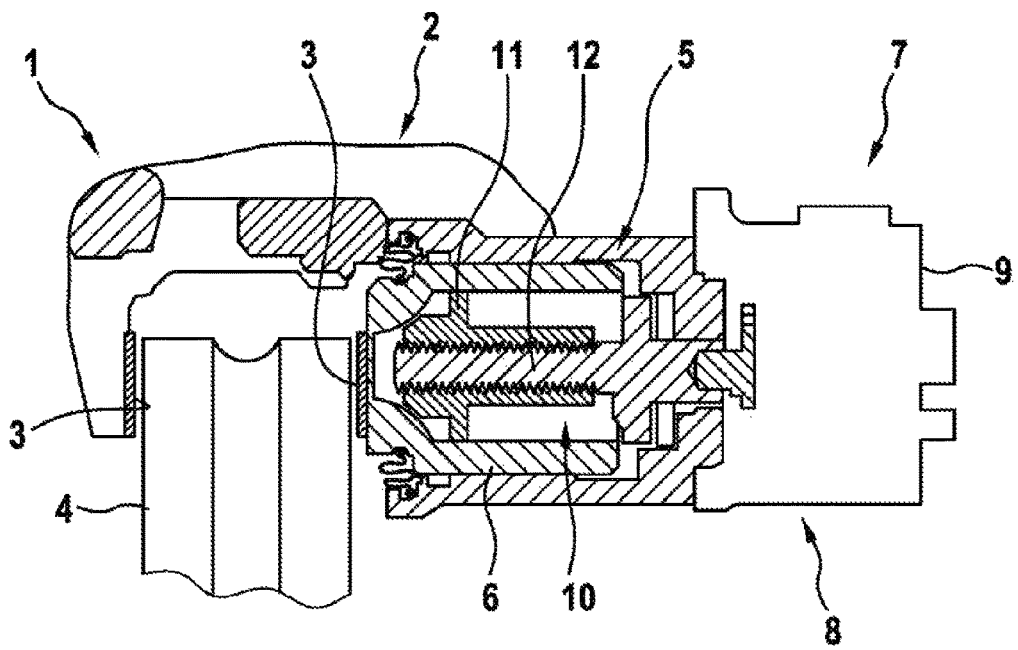
FIG. 1 illustrates an exemplary embodiment of a parking brake in a simplified sectional view and FIG. 2 illustrates a simplified equivalent circuit diagram of an electric motor of the parking brake.

FIG. 1 illustrates a simplified sectional view of a wheel brake device 1 of a brake system of a motor vehicle that is not further illustrated in this figure. Expediently, the motor vehicle comprises at least two wheels that are allocated in each case a corresponding wheel braking device 1. The wheel braking device 1 is embodied as a disc brake and comprises for this purpose a brake caliper 2 that supports the brake pads 3 between which it is possible to clamp or brace a brake disc 4 that is connected in a non-rotatable manner to a wheel of the motor vehicle. For this purpose, an actuator 5 is allocated to the brake caliper 2, said actuator comprising a brake piston 6 that can be hydraulically actuated in order to fixedly clamp the brake disc 4 between the brake pads 3 on demand. As a result of the fixedly clamped arrangement, a friction-type connection that exerts a braking torque on the respective wheel is produced between the brake disc 4 and the brake linings 3.

The wheel braking device 1 is moreover equipped with an integrated parking brake 7. For this purpose, the wheel braking device 1 comprises an actuator 8 that is formed from an electric motor 9, a gear mechanism 10 and an adjusting element 11. An output shaft of the electric motor 9 is operatively connected to the gear mechanism 10. For this purpose, the output shaft is connected in a non-rotatable manner to a drive spindle 12 that comprises an outer thread that cooperates with an inner thread of the adjusting element 11 that can be displaced along the drive spindle 12. The drive spindle is set into a rotational movement by means of controlling the electric motor 9, and as a consequence, the adjusting element 11 is displaced axially along the drive spindle 12. The adjusting element 11 can be displaced from a release position into a clamping position in which the adjusting element 11 forces the brake piston 6 against the brake disc 4 and as a consequence fixedly clamps or closes the brake disc 4 between the brake pads 3. The adjusting element 11 is arranged coaxially with respect to the brake piston and within the brake piston 6. The parking brake 7 is embodied in particular in a self-locking manner by means of the gear mechanism 10 so that if the electric motor 9 has been actuated, in order to clamp the parking brake, it is possible to release said parking brake only by means of controlling the electric motor 9 in that the drive shaft of the electric motor 9 is driven in the opposite direction and as a consequence the adjusting element 11 is moved out of the clamped position back into the released position.

In order to release the parking brake 7, the electric motor 9 is expediently controlled in such a manner that the adjusting element 11 is displaced from the clamping position into the release position in such a manner that an air gap is set between the brake pads 3 and the brake disc 4. The term "air gap" is understood to mean a gap between the brake pads 3 and the brake disc 4, said gap ensuring that the brake disc 4 can freely rotate and wear on the brake pads 3 and the brake disc 4 is avoided. In order to ensure that the correct air gap is set, the method described hereinunder is provided, said method being implemented by a control device that is allocated to the braking system or the parking brake 7. The actual movement path of the adjusting element 11 is determined by means of the method and where appropriate is compared to a desired movement path in order to be able to ascertain the adjustment of the adjusting element 11 and thereby the gap between said adjusting element and the brake disc 4 during operation without it being necessary to provide a separate movement path sensor, such as by way of example a Hall sensor or a rotational speed sensor.

For this purpose it is provided that the actual braking path of the adjusting element 11 is determined in dependence upon an integrated rotational speed signal that is produced from a measured motor current and a measured motor voltage of the electric motor 9 and from correcting values. The motor current and the motor voltage are ascertained and evaluated when switching on the electric motor 9. In particular, the motor resistance $R_M$ and the motor constant $K_M$ are determined in dependence upon the ascertained current values and voltage values. A rotational speed signal is then calculated using the current values and voltage values and these motor parameters, said rotational speed signal being integrated to form a travel signal. Since the motor parameters motor constant and motor resistance are only calculated during the course of the opening procedure, the integration is started with base parameters. These base parameters can be calculated by way of example on the basis of the construction data of the parking brake 7 or are ascertained and stored when producing or first bringing into operation the parking brake 7. The integration is then performed in such a manner that the integration begins and then as soon as prevailing values of the above-mentioned motor parameters motor resistance and motor constant are available, the integration is corrected by means of said prevailing values.

Figure 2:
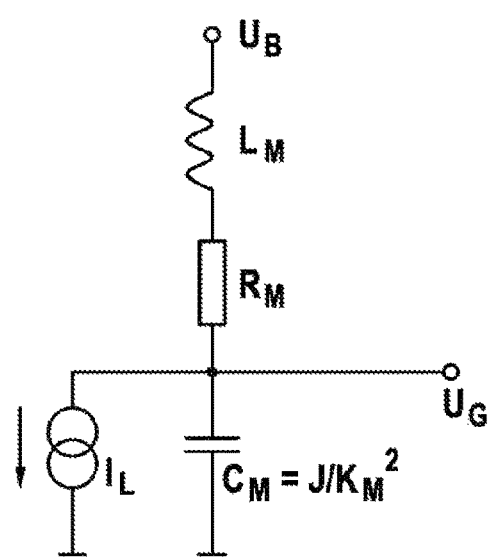

FIG. 2 illustrates in addition an equivalent circuit diagram of the electric motor 9. A switch-on peak occurs when switching on the electric motor 9 and the motor resistance $R_M$ and the motor constant $K_M$ are determined in dependence upon said switch-on peak. The mass inertia J and the inductivity $L_M$ of the armature of the electric motor 9 are provided as is known. $I_L$ is the idle running current of the electric motor 9 in the load-free state.

The motor rotational speed n is integrated by way of the task cycles $T_{cyc}$ to calculate the movement path of the adjusting element 11. The follow equation applies for the voltage balance:

$$U_B = L_M \cdot \frac{di}{dt} + R_M \cdot i + u_G$$

The generator voltage $U_G$ is indicated with $K_M \cdot \omega$, wherein $\omega$ is the angular frequency. For current values i and for voltage values u that can be measured in the control device, the following consequently applies for $\omega$:

$$\omega = \frac{u - L_M \cdot \frac{\Delta i}{T_{cyc}} - R_M \cdot i}{K_M} = \frac{1}{K_M} \cdot \left(u - L_M \cdot \frac{\Delta i}{T_{cyc}}\right) - \frac{R_M}{K_M} \cdot i$$

The travel signal is formed by way of a simple integration of the path increments $\Delta_s$, wherein n is the rotational speed and ü is the transmission ratio of the gear mechanism 10:

$$\Delta_S = n \cdot T_{cyc} \cdot ü =$$

$$\frac{T_{cyc} \cdot ü}{2 \cdot \pi} \cdot \omega = \frac{T_{cyc} \cdot ü}{2 \cdot \pi} \cdot \frac{1}{K_M} \cdot \left(u - L_M \cdot \frac{\Delta i}{T_{cyc}}\right) - \frac{T_{cyc} \cdot ü}{2 \cdot \pi} \cdot \frac{R_M}{K_M} \cdot i$$

$$S = \sum \Delta_S = \frac{T_{cyc} \cdot ü}{2 \cdot \pi} \cdot \frac{1}{K_M} \cdot \sum \left(u - \frac{L_M}{T_{cyc}} \cdot \Delta i\right) - \frac{T_{cyc} \cdot ü}{2 \cdot \pi} \cdot \frac{R_M}{K_M} \cdot \sum i$$

The movement path is consequently calculated by way of two terms that are to be integrated separately, said terms being multiplied with the factors $f_1(K_M)$ and $f_2(K_M, R_M)$:

$$s = f_1(K_M) \cdot \sum \left(u - \frac{L_M}{T_{cyc}} \cdot \Delta i\right) - f_2(K_M, R_M) \cdot \sum i$$

The factors $f_1$ and $f_2$ are corrected using the prevailing ascertained motor parameters motor resistance $R_{M\_new}$ and motor constant $K_{M\_new}$, wherein the values of the motor constant and the motor resistance that are used as base values or default values are included in the calculation as $K_{M\_old}$ or $R_{M\_old}$:

$$f_{1new} = f_{1old} \cdot \frac{K_{M\_old}}{K_{M\_new}}$$

$$f_{2new} = f_{2old} \cdot \frac{K_{M\_old} \cdot R_{M\_new}}{K_{M\_new} \cdot R_{M\_old}}$$

The movement path when moving the adjusting element 11 from the clamping position into the release position, in other words eventually the opening path of the parking brake 7, can consequently be calculated during the entire controlling procedure, wherein the integration of the path signal already occurs with the beginning of the controlling procedure and is then corrected as soon as the new or prevailing motor parameters motor resistance and motor constant are available.

It is thereby possible to calculate the actual movement path of the adjusting element 11 in a simple manner when controlling the electric motor 9 so that it is possible to omit additional sensors for ascertaining the movement of the adjusting element 11. The controlling procedure of the electric motor 9 is expediently regulated with the knowledge of the actual movement path so that the actual movement path corresponds in particular to a desired movement path that is provided by means of the control device.

The invention claimed is:

1. A method for operating a parking brake including an actuator having an adjusting element and an electric motor operatively connected to the adjusting element, the method comprising:
    storing a first motor constant of the electric motor and a first motor resistance of the electric motor in a non-volatile storage device;
    controlling the electric motor in order to displace the adjusting element along a predetermined movement path;
    determining a rotational speed signal of the electric motor based on the first motor constant and the first motor resistance at a first time during the displacement of the adjusting element;
    determining a motor current of the electric motor and a motor voltage of the electric motor during the displacement of the adjusting element;
    determining a second motor constant and a second motor resistance based on the determined motor current and the determined motor voltage at a second time after the first time during the displacement of the adjusting element;
    switching to determining the rotational speed signal of the electric motor based on the second motor constant and the second motor resistance instead of the first motor constant and the first motor resistance during the displacement of the adjusting element; and
    integrating the rotational speed signal to determine an actual movement path of the adjusting element during the displacement of the adjusting element.

2. The method as claimed in claim 1, further comprising: determining the second motor constant and the second motor resistance when switching on the electric motor during the displacement of the adjusting element.

3. A device for operating a parking brake, comprising:
    an actuator having an adjusting element configured to be displaced along a predetermined movement path, and an electric motor operatively connected to the adjusting element and configured to displace the adjusting element along the predetermined movement path; and
    a control device operatively connected to the actuator and configured to
        store a first motor constant of the electric motor and a first motor resistance of the electric motor in a non-volatile storage device,
        control the electric motor in order to displace the adjusting element along the predetermined movement path,
        determine a rotational speed signal of the electric motor based on the first motor constant and the first motor resistance at a first time during the displacement of the adjusting element, determine a motor current of the electric motor and a motor voltage of the electric motor during the displacement of the adjusting element, determine a second motor constant and a second motor resistance based on the determined motor current and the determined motor voltage at a second time after the first time during the displacement of the adjusting element, switch to determining the rotational speed signal of the electric motor based on the second motor constant and the second motor resistance instead of the first motor constant and the first motor resistance during the displacement of the adjusting element, and integrate the rotational speed signal to determine an actual movement path of the adjusting element during the displacement of the adjusting element.

* * * * *